US008016600B2

(12) United States Patent
Li

(10) Patent No.: US 8,016,600 B2
(45) Date of Patent: Sep. 13, 2011

(54) ELECTRONIC DEVICE AND POWER ADAPTOR AND METHOD FOR AUTOMATICALLY DISCONNECTING ELECTRONIC DEVICE AND POWER ADAPTOR

(75) Inventor: Jun-Tao Li, Shenzhen (CN)

(73) Assignees: Hon Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 3 days.

(21) Appl. No.: 12/621,525

(22) Filed: Nov. 19, 2009

(65) Prior Publication Data

US 2010/0261360 A1    Oct. 14, 2010

(30) Foreign Application Priority Data

Apr. 11, 2009    (CN) .......................... 2009 1 0301494

(51) Int. Cl.
*H01R 11/30*    (2006.01)

(52) U.S. Cl. ......................................................... 439/39

(58) Field of Classification Search .................... 439/38, 439/39, 36, 218; 320/160, 106, 109, 111, 320/124
See application file for complete search history.

(56) References Cited

U.S. PATENT DOCUMENTS 7,351,066 B2 * 4/2008 DiFonzo et al. ................ 439/39
* cited by examiner

*Primary Examiner* — Alexander Gilman
(74) *Attorney, Agent, or Firm* — Altis Law Group, Inc.

(57) ABSTRACT

A power adaptor is connected between a power supply and an electronic device. The electronic device includes a device charging connector, and an electricity storing unit connected to the device charging connector. The power adaptor includes a power source connector and a first magnetic body. The power source connector is capable of electrically connecting with the device charging connector such that the electricity storing unit is charged by the power supply. The first magnetic body is arranged on the power source connector. The electronic device further includes a second magnetic body. When the electricity storing unit is fully charged, a direction of magnetic field of the second magnetic body is set such that a repelling force is generated between the first magnetic body and the second magnetic body, thus an electrical connection between the power source connector and the device charging connector is disconnected.

8 Claims, 4 Drawing Sheets

ELECTRONIC DEVICE AND POWER ADAPTOR AND METHOD FOR AUTOMATICALLY DISCONNECTING ELECTRONIC DEVICE AND POWER ADAPTOR

BACKGROUND

1. Technical Field

The present disclosure relates to recharging systems, and particularly to a method for automatically disconnecting an electronic device from a recharging device.

2. Description of Related Art

A battery of an electronic device, such as a phone, is recharged by a power supply via a power adaptor. When the battery of the electronic device is fully charged, the power adaptor still charges the battery such that the battery of the electronic device may be overcharged, thus the reliability of the battery decreases.

Therefore, improved electronic devices, power adaptors, and method for disconnecting the electronic devices and the power adaptors are desired.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
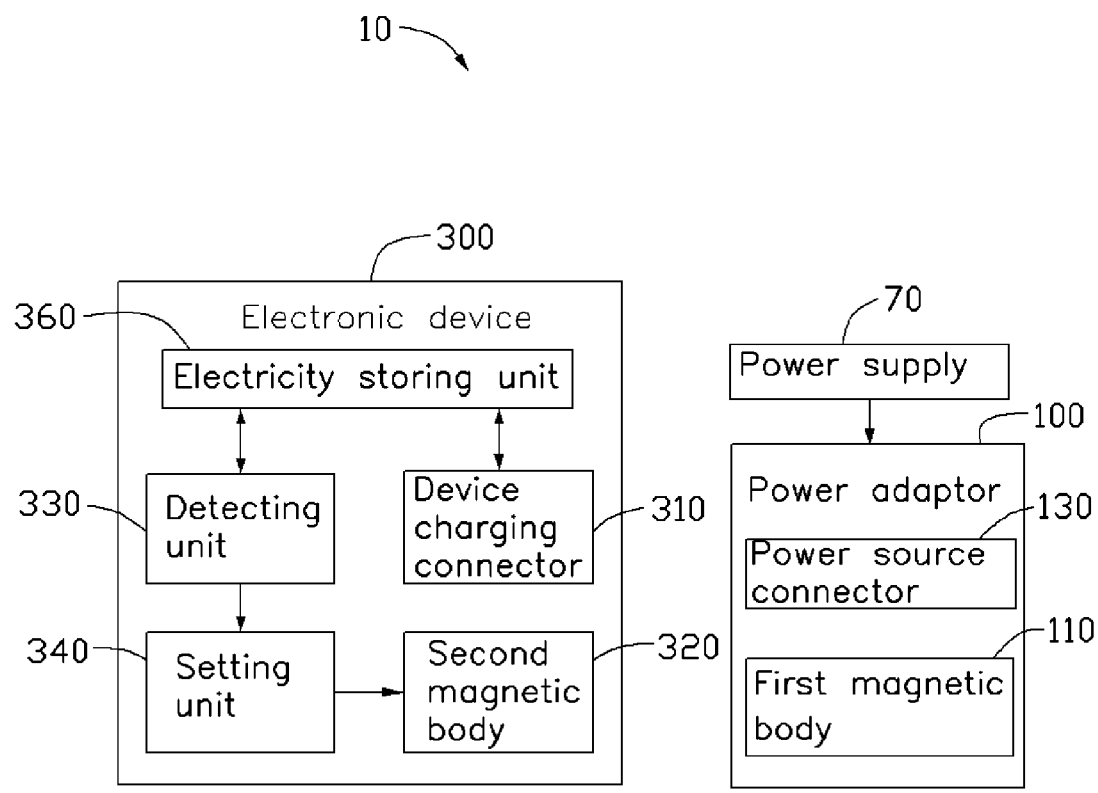
FIG. 1 is a block diagram of a recharging system having an electronic device and a power adaptor in accordance with an exemplary embodiment.

Referring to FIG. 1, a recharging system 10 includes a power supply 70, an electronic device 300, and a power adaptor 100 capable of electrically connecting between the power supply 70 and the electronic device 300. The electronic device 300 may be a cell phone, a digital camera, etc.

Figure 2:
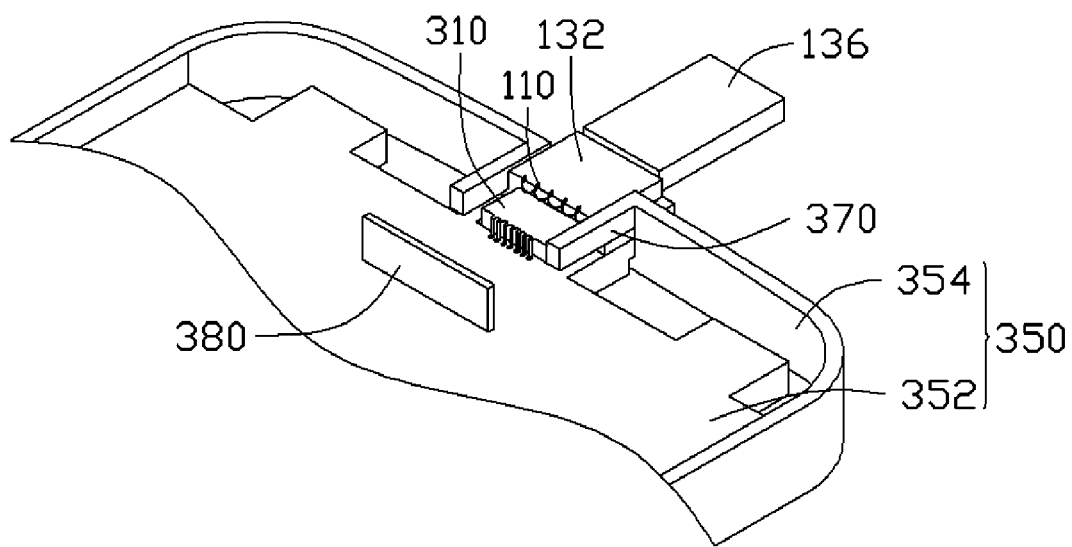
FIG. 2 is an isometric view of the recharging system in FIG. 1 in accordance with an exemplary embodiment.
Figure 3:
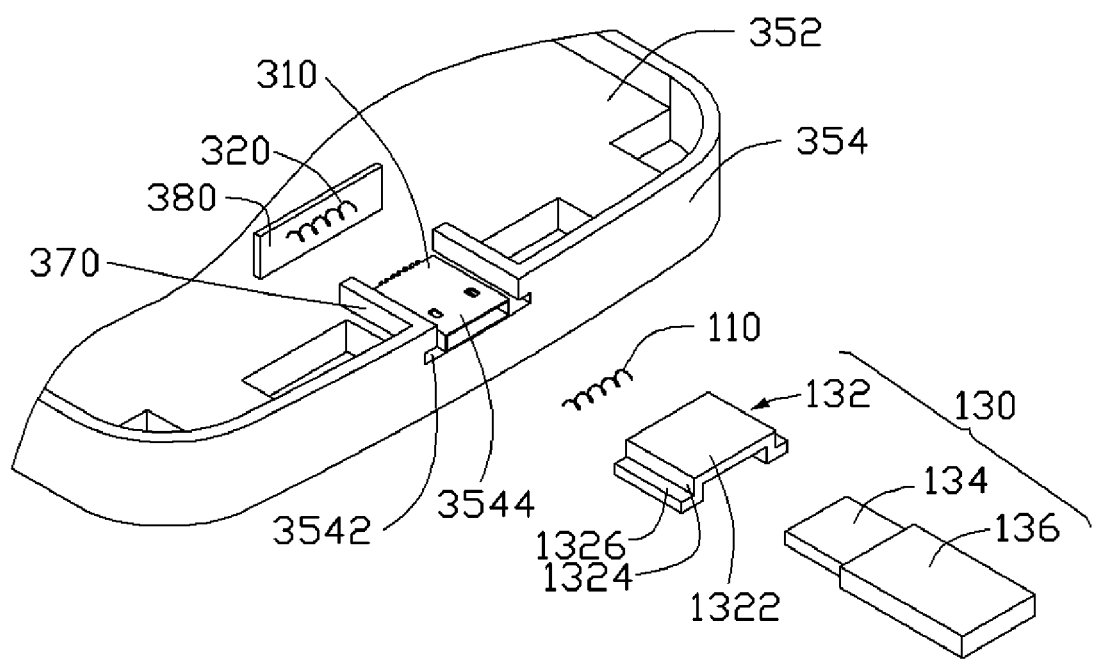
FIG. 3 is an exploded view of the recharging system in FIG. 2.

Referring also to FIGS. 2 and 3, the power adaptor 100 includes a power source connector 130, and a first magnetic body 110 mounted on the power source connector 130. The power source connector 130 includes a rectangular handle member 136, a rectangular plug 134 connected to the handle member 136, and a transmitting member 132. The plug 134 is thinner than the handle member 136.

The transmitting member 132 includes a rectangular base sheet 1322, two rectangular rails 1326, and two rectangular connecting portions 1324. The two rails 1326 are parallel to the base sheet 1322. The two connecting portions 1324 are perpendicularly connected between the two rails 1326 and opposite sides of the base sheet 1322 correspondingly. The base sheet 1322 is disposed between two rails 1326. The first magnetic body 110 is fastened on one end of the base sheet 1322. In the embodiment, the first magnetic body 110 may be a coil of wire.

The electronic device 300 includes a housing 350, a device charging connector 310, two restricting members 370, a fixing board 380, and a second magnetic body 320. The housing 350 includes a bottom board 352 and a sidewall 354 perpendicularly connected to the bottom board 352. The sidewall 354 defines a rectangular first opening 3542 and a rectangular second opening 3544. The first opening 3542 communicates with the second opening 3544. The first opening 3542 is parallel to the second opening 3544, and a width of the first opening 3542 is larger than that of the second opening 3544.

The fixing board 380 is connected to the bottom board 352 and parallel to the sidewall 354. The second magnetic body 320 is fastened on the fixing board 380 at the side facing the sidewall 354.

The device charging connector 310 is received in the first opening 3542 and fastened on the sidewall 354. The two restricting members 370 are substantially perpendicular to the sidewall 354 and connected to an inner surface of the sidewall 354. The second opening 3544 is defined between the two restricting members 370.

The electronic device 300 further includes an electricity storing unit 360 (see FIG. 1), a detecting unit 330, and a setting unit 340. The electricity storing unit 360 is connected to the device charging connector 310. The electricity storing unit 360 is used for storing electricity. In the embodiment, the electricity storing unit 360 may be a battery.

When the electronic device 300 needs to be charged, the transmitting member 132 is slid in the housing 350 and sleeved on the device charging connector 310. That is, the base sheet 1322 is received in the second opening 3544, the rails 1326 are received in the first opening 3522, and the device charging connector 310 is disposed between the two rails 1326.

Then, the plug 134 of the power source connector 130 is mated with the device charging connector 310 to establish an electrical connection between the device charging connector 310 and the power source connector 130, such that the electricity storing unit 360 is charged by the power supply 70. At the same time, the handle member 136 is in contact with another end of the base sheet 1322 away from the first magnetic body 110. The first magnetic body 110 is parallel to the second magnetic body 320. In the embodiment, the second magnetic body 310 may be a coil of wire.

The detecting unit 330 is connected to the electricity storing unit 360. The detecting unit 330 is used for detecting whether the electricity storing unit 360 is fully charged and generating a setting signal when the electricity storing unit 360 is fully charged.

In the embodiment, the detecting unit 330 periodically detects a voltage of the electricity storing unit 360. When the electricity storing unit 360 is being charged, the voltage increases as the charged capacity increases. When the electricity storing unit 360 is fully charged, the voltage stops increasing. The detecting unit 330 determines whether the electricity storing unit 360 is fully charged by detecting no increase in the voltage for two successive detections.

In another embodiment, the detecting unit 330 detects whether the electricity stored in the electricity storing unit 360 is at least a predetermined value. When the electricity stored in the electricity storing unit 360 is larger than or equal to the predetermined value, the electricity storing unit 360 is fully charged.

The setting unit 340 is used for setting a direction of magnetic field of the second magnetic body 320 in response to the setting signal, such that a repelling force is generated between the first magnetic body 110 and the second magnetic body 320, thus the transmitting member 132, the handle member 136 in contact with the transmitting member 132, and the plug 134 connected to the handle member 136 are pushed out of the housing 350. Therefore, when the electricity storing unit 360 is fully charged, the electronic device 300 and the power adaptor 100 disconnect automatically, thus the electricity storing unit 360 of the electronic device 300 will not be overcharged.

In the embodiment, the setting unit 340 sets the direction of magnetic field of the second magnetic body 320 via setting a direction of a current flowing through the second magnetic body 320.

Figure 4:
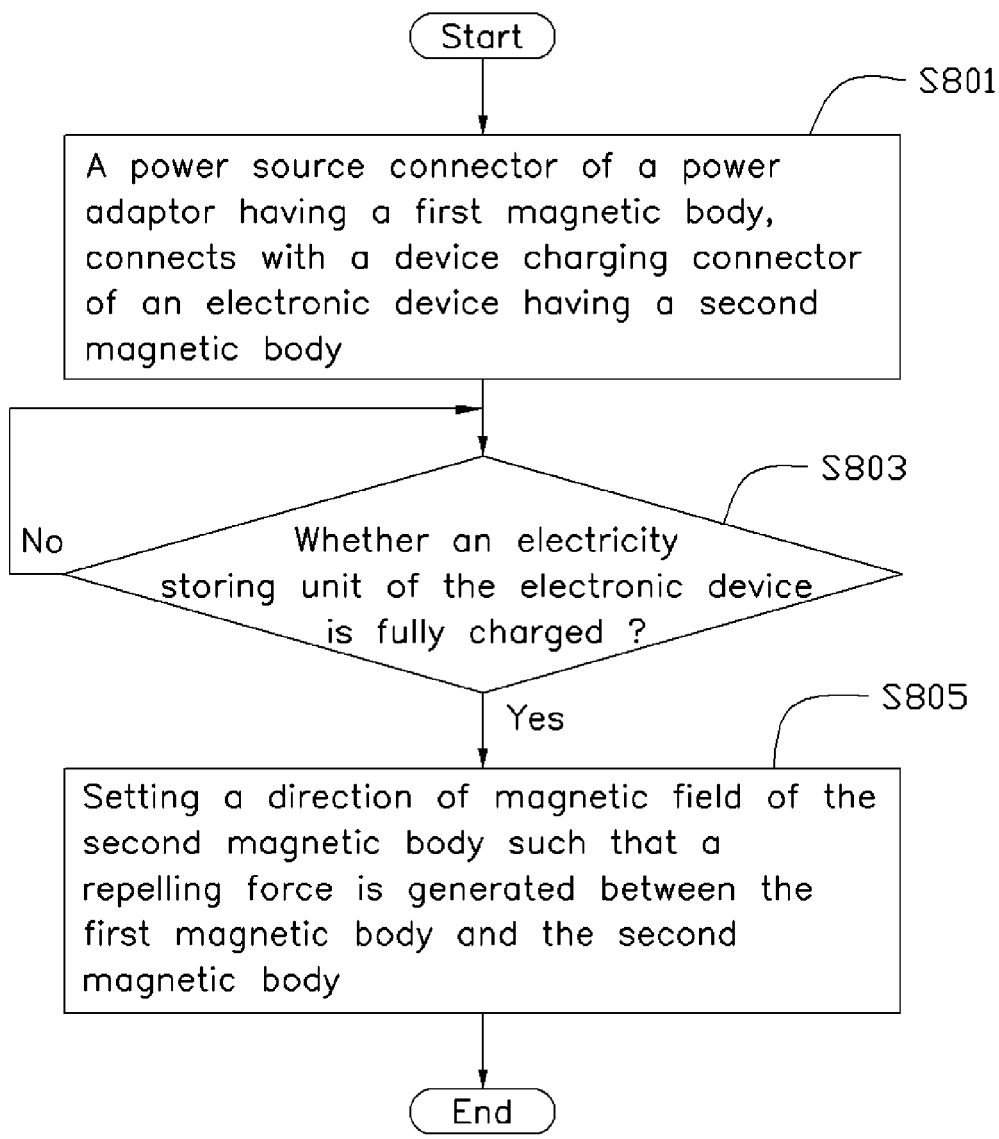
FIG. 4 is a flowchart of method for automatically disconnecting the electronic device and the power adaptor in accordance with an exemplary embodiment.

Referring to FIG. 4, a method is used for automatically disconnecting an electronic device and a power adaptor. The power adaptor includes a power source connector and a first magnetic body arranged on the power source connector. The electronic device includes a device charging connector and a second magnetic body. The first magnetic body and the second magnetic body may be coils of wire. The method includes following steps.

In step S801, the power source connector is mated with the device charging connector of the electronic device to establish an electrical connection between the device charging connector and the power source connector, such that an electricity storing unit of the electronic device is charged. At the same time, the first magnetic body and the second magnetic body are parallel.

In step S803, detecting whether the electricity storing unit of the electronic device is fully charged. If the electricity storing unit is fully charged, step S805 is implemented. If the electricity storing unit is not fully charged, step S803 is repeated.

In the embodiment, a voltage of the electricity storing unit is periodically detected. When the electricity storing unit is being charged, the voltage increases as the charged capacity increases. When the electricity storing unit is fully charged, the voltage stops increasing. Whether the electricity storing unit is fully charged is determined by detecting no increase in the voltage for two successive detections. The electricity storing unit may be a battery.

In another embodiment, when electricity stored in the electricity storing unit is at least a predetermined value, the electricity storing unit is fully charged.

In step S805, setting a direction of magnetic field of the second magnetic body such that a repelling force is generated between the first magnetic body and the second magnetic body, thus the power source connector is pushed out the device charging connector, the power source connector is automatically disconnected with the device charging connector, the electricity storing unit of the electronic device will not be overcharged. In the embodiment, the direction of magnetic field of the second magnetic body is set via setting a direction of a current flowing through the second magnetic body.

It is to be understood, however, that even though information and advantages of the present embodiments have been set forth in the foregoing description, together with details of the structures and functions of the present embodiments, the disclosure is illustrative only; and that changes may be made in detail, especially in matters of shape, size, and arrangement of parts within the principles of the present embodiments to the full extent indicated by the broad general meaning of the terms in which the appended claims are expressed.

What is claimed is:

1. An electronic device capable of electrically connecting with a power supply via a power adaptor, the power adaptor comprising a power source connector and a first magnetic body, the first magnetic body being arranged at the power source connector, the electronic device comprising:

a housing;

a device charging connector arranged at the housing, the device charging connector capable of being mated with the power source connector to establish an electrical connection therebetween;

a second magnetic body arranged at the housing;

an electricity storing unit connected to the device charging connector, the electricity storing unit being configured to store electricity provided by the power supply;

a detecting unit configured to detect whether the electricity storing unit is fully charged and generating a setting signal when the electricity storing unit is fully charged; and a setting unit configured to set a direction of magnetic field of the second magnetic body in response to the setting signal such that a repelling force is generated between the first magnetic body and the second magnetic body, thus the electrical connection between the power source connector and the device charging connector is disconnected;

wherein the housing comprises a bottom board and a sidewall perpendicular to the bottom board, the sidewall defines a rectangular first opening, the device charging connector is received in the first opening and is fastened on the sidewall, the electronic device further comprises a fixing board parallel to the sidewall, the second magnetic body is arranged on the fixing board at the side facing the sidewall;

wherein the sidewall defines a rectangular second opening communicating with the first opening, and a width of the first opening is larger than that of the second opening, the power source connector comprises a handle member, a plug member connected to the handle member, and a transmitting member; the transmitting member includes a base sheet, two rails parallel to the base sheet, and two connecting portions connect between the base sheet and the two rails correspondingly; when the power source connector is electrically connected with the device charging connector, the base sheet is received in the second opening, the two rails are received in the first opening; the device charging connector is disposed between the two rails; the first magnetic body is fastened on one end of the transmitting member, another end of the transmitting member away from the first magnetic body is in contact with the handle member.

2. The electronic device according to claim 1, wherein the second magnetic body is parallel to the first magnetic body when the device charging connector is mated with the power source connector.

3. The electronic device according to claim 1, wherein the detecting unit periodically detects a voltage of the electricity storing unit, when the electricity storing unit is being charged, the voltage increases as the charged capacity increases; when the electricity storing unit is fully charged, the voltage stops increasing; the detecting unit determines whether the electricity storing unit is fully charged by detecting no increase in the voltage for two successive detections.

4. The electronic device according to claim 1, wherein when the detecting unit detects that the electricity stored in the electricity storing unit is larger than or equal to a predetermined value, the electricity storing unit is fully charged.

5. The electronic device according to claim 1, wherein the setting unit sets the direction of magnetic field of the second magnetic body via setting a direction of a current flowing through the second magnetic body.

6. The electronic device according to claim 1, wherein the electronic device further comprises two restricting members;

the two restricting members are perpendicularly connected to an inner surface of the sidewall, and the second opening is defined between the two restricting members.

7. A power adaptor connected between a power supply and an electronic device, the electronic device comprising a device charging connector, and an electricity storing unit connected to the device charging connector, the power adaptor comprising:
- a power source connector capable of electrically connecting with the device charging connector such that the electricity storing unit is charged by the power supply; and
- a first magnetic body arranged on the power source connector, the electronic device further comprising a second magnetic body, when the electricity storing unit is fully charged, a direction of magnetic field of the second magnetic body being set such that a repelling force is generated between the first magnetic body and the second magnetic body, thus an electrical connection between the power source connector and the device charging connector is disconnected;

wherein the power source connector comprising a plug, a handle member connected to the plug, and a transmitting member; the first magnetic body is disposed on one end of the transmitting member, another end of the transmitting member away from the first magnetic body is in contact with the handle member;

wherein the transmitting member comprises a base sheet, two rails parallel to the base sheet, and two connecting portions connected between the base sheet and two rails correspondingly, the first magnetic body is disposed on one end of the base sheet, another end of the base sheet away from the first magnetic body is contact with the handle member.

8. The power adaptor according to claim 7, wherein the first magnetic body is parallel to the second magnetic body when the power source connector is electrically connected with the device charging connector.

* * * * *